United States Patent Office 3,073,790
Patented Jan. 15, 1963

3,073,790
DISPERSION CONSISTING OF POLYPROPYLENE CONTAINING ISOTACTIC MACROMOLECULES AND WATER
Achille Bosoni, Milan, Italy, assignor to Montecatini Società Generale per l'Industria Mineraria e Chimica, Milan, Italy, a corporation of Italy
No Drawing. Filed Oct. 4, 1957, Ser. No. 688,141
Claims priority, application Italy Oct. 9, 1956
3 Claims. (Cl. 260—29.6)

This invention relates to new compositions of matter comprising aqueous dispersions of solid, high molecular weight, poly(alpha-olefines).

Recently, G. Natta and his co-workers have disclosed the production of a new series of polymers of alpha-olefines $CH_2$=CHR in which R is a hydrocarbon radical. The new polymers are of two different steric structures by reason of which the polymers are either crystalline or non-crystalline.

The new stereoisomeric polymers, for example, the stereoisomeric polypropylenes, are obtained by polymerizing propylene with the aid of a catalyst prepared from a compound, for instance a halide of a transition metal of groups IV to VI of the periodic table and a metallorganic compound of a metal of groups I–III of the periodic table, in a hydrocarbon solvent inert to the catalyst, at atmospheric or slightly increased pressure and at temperatures of, for example, 50° C. to 120° C.

As Natta et al. have shown, the crude polypropylene thus obtained normally comprises a mixture of polymers which are, respectively, amorphous or non-crystallizable, partially crystallizable, and highly crystallizable, and which can be separated on the basis of their different steric structures by means of selective solvents.

Natta et al. have also shown that by selecting specific catalysts from the general class mentioned, it is possible to orient the polymerization of the alpha-olefine, e.g., propylene, to the production of prevailingly to completely crystallizable polymers or to the production of prevailing to completely non-crystallizable polymers.

The catalyst prepared directly from a solid, low valency compound of the transition metal, for instance, titanium trichloride, and a metal alkyl such as triethyl aluminum, is difficultly dispersible in the hydrocarbon solvent used as the polymerization medium and yields, directly, a polypropylene which is at least prevailingly (i.e. more than 50%) crystallizable or which is substantially crystallizable.

The crystallizable and non-crystallizable polymers were called, respectively, isotactic and atactic polymers by G. Natta, and those terms have been adopted by the art.

The isotactic polymers are linear, head-to-tail polymers consisting essentially of macromolecules in which substantially all of the asymmetric tertiary main-chain carbon atoms of adjacent monomeric units have the same steric configuration and the main chain of the macromolecules, if fully extended in a plane, shows substantially all of the R groups on one side of the plane and all of the hydrogen atoms bound to the tertiary carbon atom on the opposite side.

The atactic polymers are also linear, head-to-tail polymers, but consist essentially of macromolecules in which tertiary asymmetric carbon atoms of the main chain having the same steric configuration have substantially a random distribution, and the main chain of the macromolecules, if fully extended in a plane, shows the R groups and the hydrogen atoms bound to the tertiary carbon atoms substantially in random distribution on the two sides of the plane.

The new poly(alpha-olefines) and particularly those which are prevailingly crystallizable or isotactic (more than 50% isotactic) have very desirable characteristics which are for the most part greatly superior to those of the thermoplastic resins known prior to the Natta et al. disclosures. These new polymers, and especially highly isotactic polypropylene, are transparent, flexible, or low density, impervious to gas and water, non-toxic, odorless, heat-resistant, and can be colored with transparent or dull dyes. Articles formed from or coated with the polypropylene can be heat-sealed. Many of the properties of the polypropylene, such as the heat-resistance and imperviousness to gas, are superior to those properties of other thermoplastic resins.

It is desirable to use the polypropylene for treating various bases or substrates, such as paper, fibers, yarns, films, fabrics, metals, asbestos, etc., for modification of the inherent characteristics of the substrate. For instance, by impregnating and/or coating substrates of the kind mentioned with prevailingly isotactic polypropylene it is possible to impart to the substrate such properties as water-repellence, impermeability to gases, resistance to chemicals and corrosive agents, or to improve the surface lustre of the substrate.

It is also desirable to employ the polypropylene for rendering fabrics crease-resistant and to confer desirable properties to the substrate such as the capacity to be heat-sealed to the same or to a different material, for example paper to paper, metal to fabric, and so on.

The most desirable and convenient method of applying the water-insoluble polypropylene to the base or substrate is in the form of an aqueous dispersion.

In the case of other thermoplastic resins it is not possible to prepare satisfactory aqueous dispersions of the resin by simply dispersing the resin in water by stirring at room temperature. Instead, special conditions are required and may involve special physical, chemical or chemico-physical measures, particularly for reducing the resin in the form of a suitable fine powder. Moreover, even when the dispersions of the known thermoplastic resins are prepared under special conditions, the maximum concentration obtainable is about 50%, and is usually lower than that.

According to the present invention it is found that, in the case of prevailingly isotactic polypropylene, aqueous dispersions of any desired concentration, even up to a concentration of 100%, can be obtained very simply, economically and conveniently, by stirring the polymer, in the form of particles having a size between 0.1 and 20 microns, into water at room temperature. The highly concentrated dispersions, which can be shipped and stored as such, with great convenience in handling and appreciable savings in freight costs and storage space, can be diluted with water to any desired lower concentration, prior to use, the diluted products being stable, homogeneous dispersions of the desired, predetermined concentration adapted to any particular purpose.

It is surprising that the finely powdered polypropylene can be dispersed in water under the conditions stated since that is not possible with the other thermoplastic resins such as the known polystyrene and polyethylene and particularly as the new, solid, prevailingly isotactic polypropylenes have, in general, very high molecular weights and may have molecular weights above 800,000. It is particularly unexpected that stable highly concentrated (up to 100% concentration) aqueous dispersions of the high molecular weight isotactic polypropylenes can be prepared by merely stirring the particulate polymer into water at room temperature because it could have been expected that the addition of even comparatively small amounts of the polymer particles to the water would result in a system in which the uniform distribution of further amounts of the particles would be inhibited.

If desired, or in certain special instances, the present aqueous dispersions of prevailingly isotactic polypropylene can be prepared under special conditions according to which the polymer is pre-treated or pre-conditioned for dispersion in the water.

However, one important aspect of this invention resides in my discovery that, by use of catalysts as described herein, polypropylene is obtained directly (i.e. as the direct product of the polymerization), in the form of particles having a suitable size in the range 0.1 to 20 microns and which can be readily dispersed in water by stirring at room temperature, without subjecting the polymer to any physical or chemical expendients designed to render it water-dispersible and without requiring the use of extraneous dispersing, emulsifying or stabilizing agents, although such adjuvants may be used in amounts between 1% and 10% by weight on the solid polymer weight, to facilitate dispersion of the particulate polymer, if desired.

Whereas the maximum concentration obtainable by dispersing the other thermoplastic resins in water, using the special conditions required, is about 50% and at that concentration the dispersion is already a paste, the present dispersions of the isotactic polypropylene having a concentration up to 100% are possible because the anhydrous polypropylene powder, being directly dispersible in the water as such, and free from other agents, can be considered as a concentrate for use in preparing the dispersions.

The following example, in which the parts are by weight unless otherwise specified, is given to illustrate the preferred method of making the aqueous dispersions of the invention, it being understood that this example is not intended as limitative. The powdered polypropylene used in the example was the direct product of the polymerization of propylene with the aid of a catalyst prepared from a low valency compound of a transition metal of groups IV to VI of the periodic table and a metallorganic compound of a metal of groups I–III of the periodic table, and was a prevailingly isotactic polypropylene.

*Example 1*

Thirty parts of water, 10 parts of a 12% ammonium polymethacrylate aqueous solution and 100 parts of the powdered polypropylene (M.W. 90,000) were introduced into a horizontal mixer. The paste obtained after 30 minutes' mixing was passed through a plate mill of the type used conventionally in preparing varnishes. The mixing and feeding to the mill can be carried out continuously.

A stable homogeneous paste was obtained. When the paste is diluted with water prior to use, a uniform polymer dispersion is obtained immediately.

The method shown in Example 1 can be used whenever the particles of the polypropylene to be dispersed have a size between 0.1 and 20 microns. The particles of polypropylene obtained directly by polymerizing the propylene with the aid of the catalysts described, and particularly of the polypropylene obtained with the aid of a catalyst prepared from a solid, low valency compound of the transition metal, e.g., titanium trichloride, and a metal alkyl such as triethyl aluminum, which catalyst is difficultly dispersible in the inert hydrocarbon solvent used as the polymerization medium, practically invariably have a size in the range of 0.1 to 20 microns. Therefore, in accordance with this invention, the simple, convenient method of Example 1 is used practically invariably for preparing the aqueous dispersions.

If, for any reason, the polymer does not occur in particle form, or if the particles, or any appreciable proportion of the particles, have a size greater than 20 microns, it is generally desirable to subject the polymer to suitable physical, chemical, or physico-chemical treatment to insure uniform dispersion thereof in water.

For instance, the polypropylene can be pulverized mechanically, using roll mixers, and during the mechanical working can be subjected to heat and the action of non-solvents therefor.

The aqueous dispersions can also be prepared by dissolving the polymer in organic, generally volatile solvents which are immiscible or poorly miscible with water, precipitating the solution in water, and evaporating the organic solvent.

Emulsification by physical or chemical treatments is favored by the presence of one or more dispersing or emulsifying agents which may be mixed with the water or with the polypropylene. Emulsification may also be the result of the action of a substance present in the polymer and a substance contained in the water on each other. For example, an emulsion results when polypropylene having a saponifiable oil admixed therewith is mixed with water containing sodium hydroxide. Protective colloids can be used as stabilizers, if desired.

If the starting polypropylene is in the form of granules, it can be reduced to a mass of particles having a size such that they can be dispersed readily in water by the method of Example 1, by working the granules in a heated roll mill (or other equivalent device), advantage being taken of both the mechanical working and the heat-treatment to condition the polymer for dispersion in the water.

It is preferable, always, to carry out the mechanical working of the granules in the presence of an oily substance or of an other agent which facilitates the working. However, if the starting polypropylene is in powder form but the size of the particles is outside the upper limit of the range in which ready dispersion of the particles by stirring at room temperature is not feasible or efficient, it is sufficient to simply dissolve the polymer in an organic solvent, emulsify the solution with water, and remove the organic solvent. Any of the known, available emulsifying agents may be used.

The illustrative examples given below show various alternative methods of making aqueous dispersions of polypropylene which involve special treatments of the polymer.

*Example 2*

100 parts of granular polypropylene (M.W. 100,000) were converted to plastic condition in a steam-heated roll mixer, and then mixed with 10 parts of oleic acid. The mixing was continued until the rolls were cool. The paste-like mass obtained was slightly dis-aggregated as a fine powder. 10 parts of a condensation product of 1.0 mol of ethyl alcohol and 17 mols of ethylene oxide were mixed with the powder and 100 parts of water. Finally, 10 parts of a 12% aqueous ammonium methacrylate solution were added.

A stable dispersion in the form of a paste in which the dispersed particles had an average diameter of 10 microns was obtained.

*Example 3*

200 parts of polypropylene (M.W. 150,000) in the form of a coarse powder, 25 parts of stearic acid, 6 parts of the condensation product of 1.0 mol of cetyl alcohol and 4 mols of ethylene oxide, and 2000 parts of trichlorethylene were mixed and refluxed at 70–80° C. until the powder was completely dissolved.

5.5 parts of potassium hydroxide were dissolved in 1500 parts of water and heated to 80° C. This solution was poured into the warm polymer solution, with stirring. The trichlorethylene was removed from the resulting emulsion by distillation at 70° C. under a pressure of 735 mm. Hg. The distillate passes through a continuous separator and water return in the still. The product remaining after complete removal of the trichlorethylene is an aqueous dispersion of the polypropylene, the average diameter of the dispersed particles being 5.0 microns.

The aqueous polypropylene dispersions of the invention are useful for numerous purposes. For example, the dispersions can be applied to fabrics, paper, plates, metal wires, cables, ropes and the like and, after removal of the water, the polymer forms a protective coating on the substrate. Application may be made by spreading the dispersion on the material to be treated with a knife, by means of a roll, a brush, or by spraying or immersion. After the coating is dried at a temperature slightly (about 5° C.) below 100° C., the polymer coating can be consolidated and rendered more uniform by pressing it by means of any suitable pressing device at a temperature above the softening temperature of the polypropylene.

If a dispersing agent is used, and to avoid a reduction in the mechanical and chemical resistance of the coating thereby, the major portion of the dispersing agent is leached out of the finished article by immersing it in warm water.

The present dispersions can also be used as both impregnating and bonding agents for porous materials such as asbestos and cork, to convert them into coherent materials which can be molded into shaped articles having entirely new characteristics.

The polypropylene dispersions have also been found to be very good adhesives for bonding various materials together, for instance as a bonding agent for two superimposed fabrics, paper sheets, or the like. After the dispersion is disposed between the two layers of fabric, paper, etc., the whole assembly or structure is dried or subjected simultaneously to heat and pressure.

The aqueous dispersions of the isotactic polypropylene can also be converted to filaments, films, bands, etc., by ejecting them through suitable openings into coagulating baths. The dispersions are adapted to many other applications for obtaining various effects.

The properties of the aqueous dispersions can be modified by the inclusion of fillers, pigments, plasticizers and the like. The addition of the modifying agents can be made after the dispersion has been prepared or at any stage in the preparation thereof.

The prevailing isotactic polypropylene may have a molecular weight of 50,000 to 800,000, or higher.

Various changes and modifications in details can be made in practicing the invention without departing from the spirit thereof and, therefore, it is intended to include in the appended claims all such variations as will be apparent to those skilled in the art.

What is claimed is:

1. An aqueous dispersion consisting of water and a polypropylene, which contains more than 50% of isotactic macromolecules, is more than 50% crystalline, has a molecular weight of at least 50,000 and a particle size of from 0.1 to 20 microns.

2. A process for producing stable aqueous dispersions which consists of admixing water and a polypropylene, which contains more than 50% of isotactic macromolecules, is more than 50% crystalline, has a molecular weight of at least 50,000 and is in the form of particles having a size of from 0.1 to 20 microns.

3. The process of claim 2, wherein said admixing is carried out at room temperature.

References Cited in the file of this patent

UNITED STATES PATENTS

| | | |
|---|---|---|
| 2,313,144 | Gomm | Mar. 9, 1943 |
| 2,369,471 | Latham | Feb. 13, 1945 |
| 2,386,674 | Flint et al. | Oct. 9, 1945 |
| 2,496,989 | Cupery | Feb. 7, 1950 |
| 2,559,752 | Berry | July 10, 1951 |
| 2,726,231 | Field et al. | Dec. 6, 1955 |

FOREIGN PATENTS

| | | |
|---|---|---|
| 538,782 | Belgium | Dec. 6, 1955 |

OTHER REFERENCES

Natta et al.: "Crystalline High Polymers of α-Olefins," JACS, volume 77, March 20, 1955, pages 1708–1710.

Sutheim: "Introduction to Emulsions," Chemical Publishing Company, Brooklyn, New York (1946), page 8.

UNITED STATES PATENT OFFICE
CERTIFICATE OF CORRECTION

Patent No. 3,073,790

January 15, 1963

Achille Bosoni

It is hereby certified that error appears in the above numbered patent requiring correction and that the said Letters Patent should read as corrected below.

Column 2, line 7, for "or low density" read -- of low density --.

Signed and sealed this 6th day of August 1963.

(SEAL)
Attest:

ERNEST W. SWIDER
Attesting Officer

DAVID L. LADD
Commissioner of Patents